United States Patent
Czernakowski et al.

[11] Patent Number: 5,954,397
[45] Date of Patent: Sep. 21, 1999

[54] CHILD SAFETY SEAT

[75] Inventors: Waldemar Czernakowski, Blaustein; Hermann Wetter; Christian Stysch, both of Ulm, all of Germany

[73] Assignee: Britax Romer Kindersicherheit GmbH, Ulm, Germany

[21] Appl. No.: 09/018,136

[22] Filed: Feb. 3, 1998

[30] Foreign Application Priority Data

Feb. 6, 1997 [GB] United Kingdom .................... 9702402

[51] Int. Cl.[6] .................................................. A47C 1/08
[52] U.S. Cl. ........................................................ 297/250.1
[58] Field of Search .............................. 297/250.1, 463.1, 297/463.2, 464; 81/488; 29/278, 270

[56] References Cited

U.S. PATENT DOCUMENTS

| | | | |
|---|---|---|---|
| 4,762,364 | 8/1988 | Young | 297/250 |
| 4,826,246 | 5/1989 | Meeker | 257/250 |
| 4,913,490 | 4/1990 | Takahashi et al. | 297/250 |
| 5,197,176 | 3/1993 | Reese . | |
| 5,496,083 | 3/1996 | Shouse, Jr. . | |
| 5,611,596 | 3/1997 | Barley et al. | 297/256.13 |
| 5,620,231 | 4/1997 | Marker et al. . | |

FOREIGN PATENT DOCUMENTS

| | | |
|---|---|---|
| 0 331 299 | 9/1989 | European Pat. Off. . |
| 42 40 450 C1 | 3/1994 | Germany . |
| 44 05 147 A1 | 8/1995 | Germany . |

*Primary Examiner*—Milton Nelson, Jr.
*Attorney, Agent, or Firm*—Davis and Bujold

[57] ABSTRACT

A child safety seat 10 is adapted to rest on a vehicle seat and to be secured thereon by a vehicle seat belt 32 which extends through an opening 16 in the child seat 10 so that the vehicle seat belt 32 passes between a seated occupant of the child seat 10 and the vehicle seat. A traveller 20 can be coupled to a tongue 30 of a vehicle seat belt 32 and then moved from one side of the child seat 10, 40 through the opening 16 to the other side of the child seat 10 so as to pull the seat belt 32 through the opening 16.

15 Claims, 3 Drawing Sheets

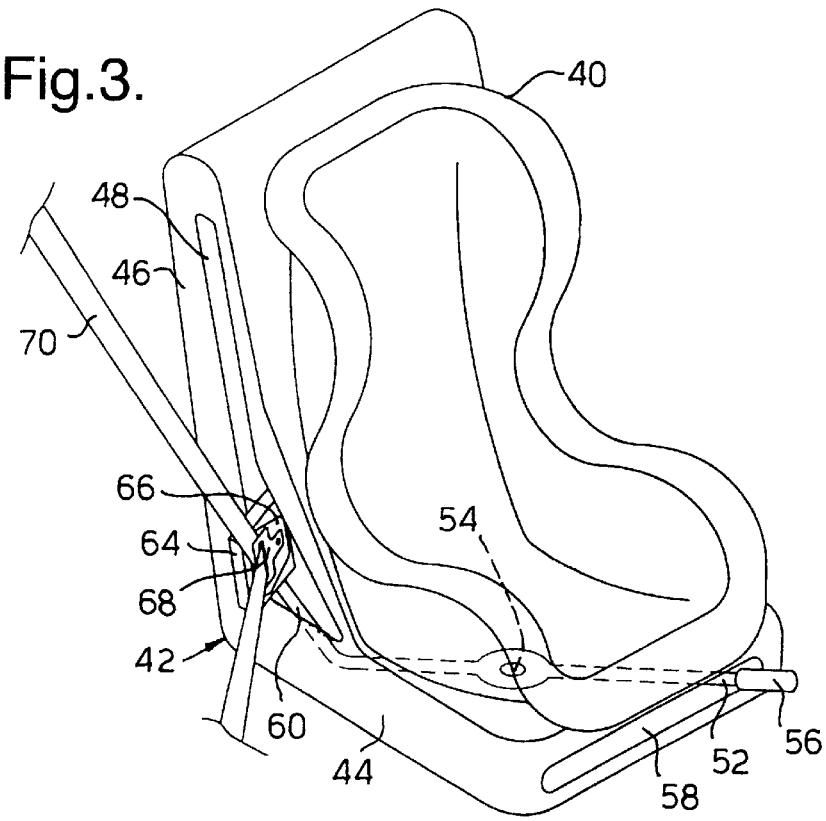
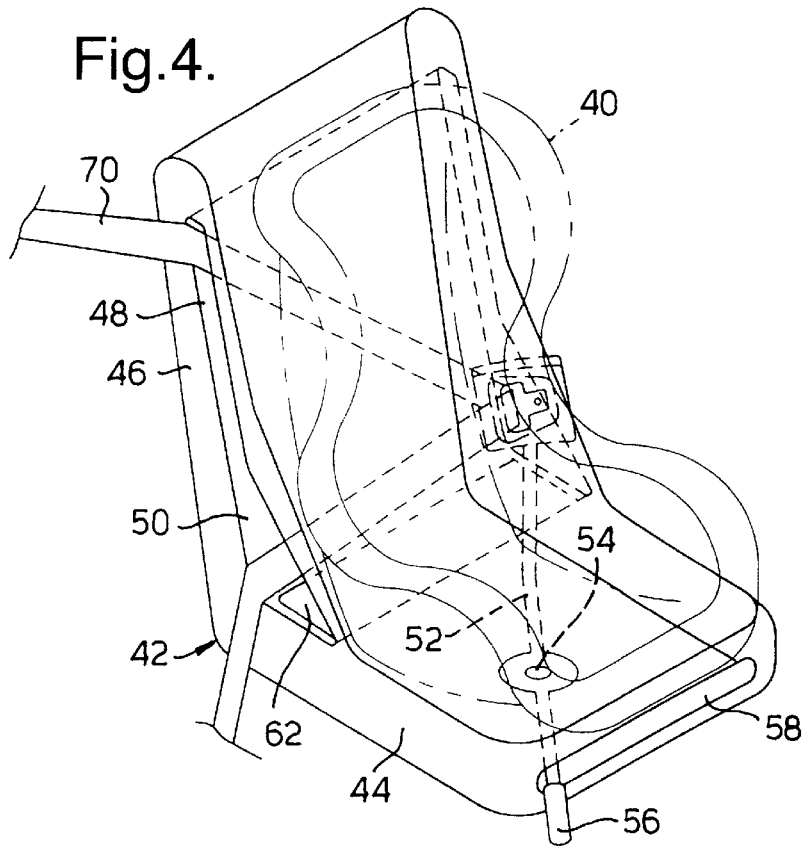

CHILD SAFETY SEAT

FIELD

This invention relates to a child safety seat of the type adapted to rest on a vehicle seat and to be secured thereon by a vehicle seat belt which extends through an opening in a formation on the child seat so that the vehicle seat belt passes between a seated occupant of the child seat and the vehicle seat.

RELATED ART

A child safety seat of this type is described in EP-A-0331299. It is desirable for the child seat to be located as close as possible to the seat back of the vehicle seat so as to maximise the available space between a seated child and the next fixed obstacle in front of the child seat (the seat back of the front vehicle seat when the child seat is used on rear vehicle seat). On the other hand, it is necessary for the opening to be wide enough to enable the vehicle seat belt to be inserted therethrough with a reasonable degree of ease. In practice, it has been necessary for the opening to be wide enough for an adult's fingers to pass therethrough while gripping the tongue of a vehicle seat belt buckle.

SUMMARY OF THE INVENTION

It is an object of the invention to provide a child safety seat of the type described above in which insertion of a vehicle seat belt through the opening is facilitated. When applied to a forward-facing child seat of the type in which the vehicle seat belt passes between the seat back of the child seat and the seat back of the vehicle seat, the invention has the advantage of reducing the distance between the vehicle seat back and a child seated in the child seat.

According to the invention, a child safety seat of the type described has a traveller movable from one side of the child seat through the opening to the other side of the child seat, means for coupling part of a vehicle seat belt to the traveller and drive means for moving the traveller along said path.

Preferably, the part of the vehicle seat belt arranged to be coupled to the traveller is a tongue for a vehicle seat belt buckle.

In one form of the invention, the traveller is slidably mounted in a track extending through said opening. The traveller may comprise a rigid slider of greater length than the track and have coupling means for engaging with a vehicle seat belt at one end and a handle at the other end for pulling and pushing the slider along the track. Preferably, coupling means and handles are provided at both ends of the slider to enable an vehicle seat belt to be pulled through the opening from either side.

In another form of the invention, a lever is pivotally mounted below a seat portion of the child seat for angular movement about a vertical axis, the traveller being mounted on one end of the lever and a handle being formed on the other end thereof.

BRIEF DESCRIPTION OF THE DRAWINGS

FIGS. 3 and 4 are perspective views, corresponding to FIGS. 1 and 2, respectively, of a second embodiment of the invention.

DETAILED DESCRIPTION OF THE PREFERRED EMBODIMENT

Figure 1:
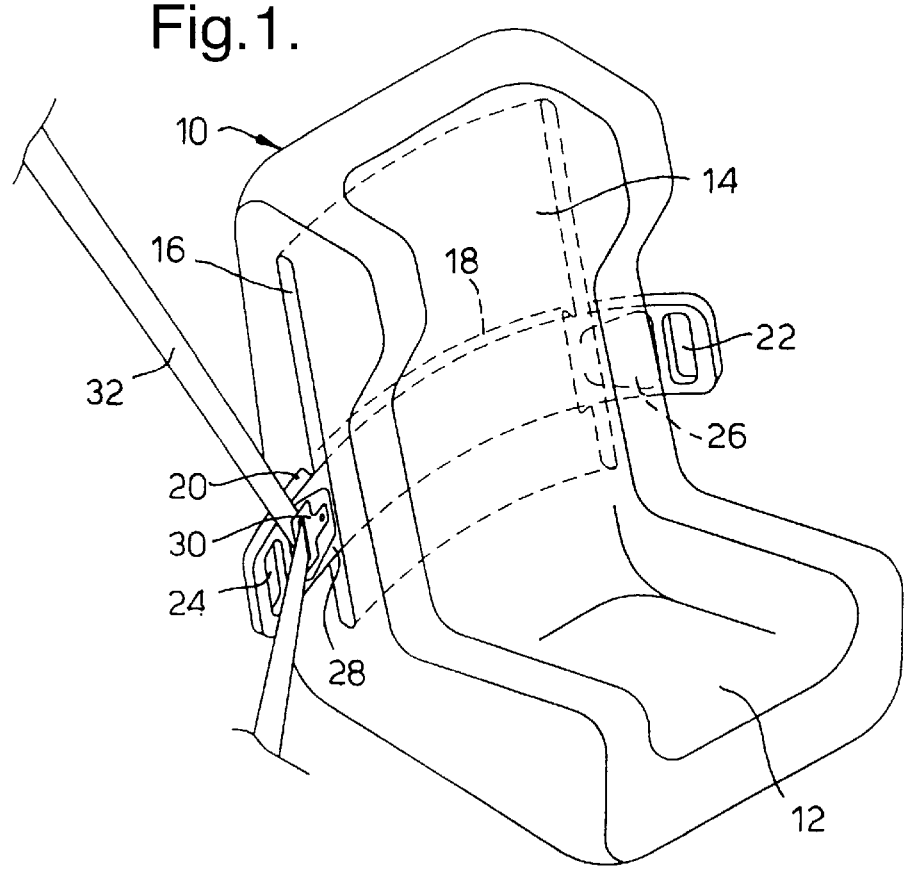
FIG. 1 is a perspective view of a first embodiment of the invention, with an vehicle seat belt positioned prior to being pulled through the opening in the child seat.
Figure 2:
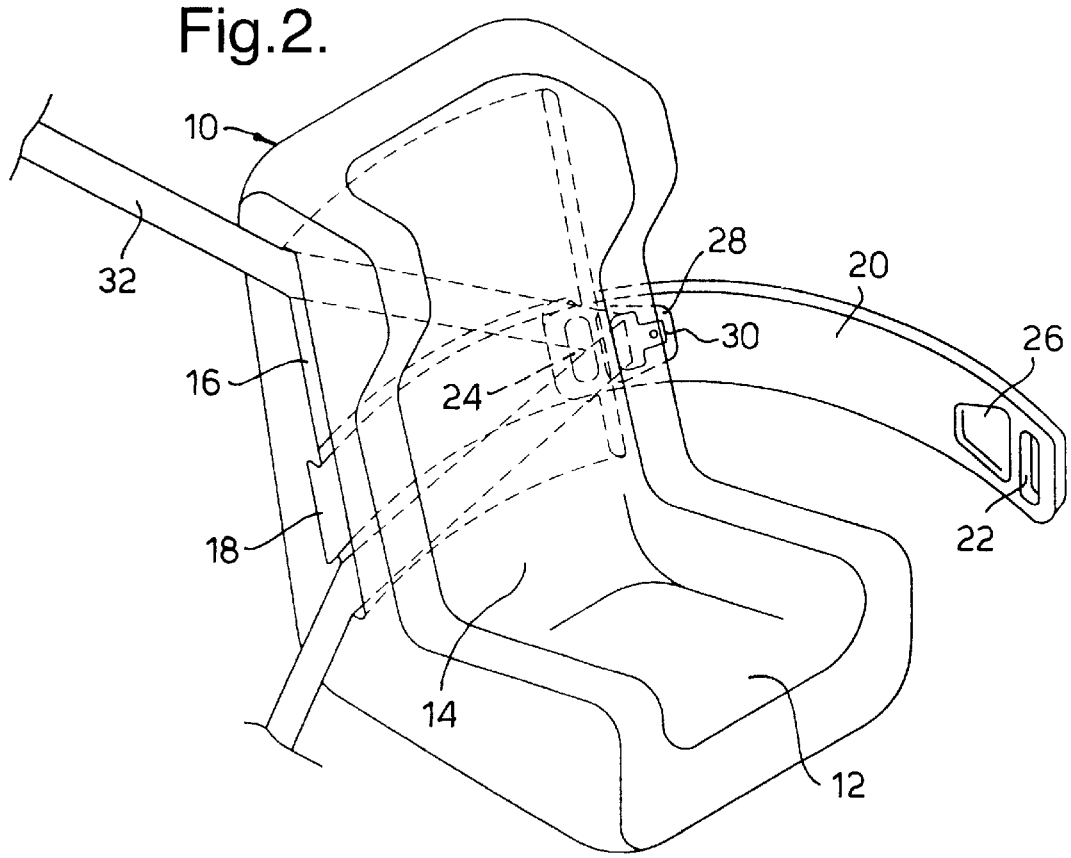
FIG. 2 is a perspective view of the seat shown in FIG. 1, showing the vehicle seat belt after it has been pulled through the opening in the child seat.

FIGS. 1 and 2 show a child safety seat 10 having a seat portion 12 and a backrest 14. A slot 16 extends through the backrest 14 from one side of the seat to the other. The width of the slot 16 (in the substantially vertical direction) is such that it occupies most of the height of the backrest. The thickness of slot 16 is sufficient to accommodate two layers of the strap of a seat belt.

A groove 18, of dovetail cross-section, is formed in the back surface of the slot 16. A slider 20 is located in the groove 18 and has bevelled edges so as to be retained captive in the groove 18 by its dovetailed edges. The slider 20 is longer than the groove 18 and, when in the position illustrated in FIG. 1, projects from both ends thereof.

Respective transverse slots 22 and 24 are formed in each end of the slider 20 to serve as handles. Adjacent to each such slot, a respective recess is formed in the projecting end zones of the slider, as illustrated in FIG. 1. Each of the recesses 26 and 28 is dimensioned to receive the tongue 30 of a buckle (not shown) for a vehicle seat belt 32. The depth of each recess 26, 28 is such that the tongue 30 is retained therein by the opposite wall of the slot 16 when the slider 20 is displaced so that such recess is within the slot 16.

If the tongue 30 is positioned in the recess 28, as illustrated in FIG. 1, and the handle 22 is pulled to move the slider 20 to the position shown in FIG. 2, the tongue 30 is pulled to the opposite side of the seat until it can be lifted out of the recess 28 and attached to its buckle (not shown). The slider 20 is then pushed back to the position shown in FIG. 1 so as to minimise its projection from the sides of the seat 10.

FIGS. 3 and 4 show another child safety seat which comprises a seat body 40 mounted on a base member 42. The base member 42 is L-shaped, having a bottom portion 44 adapted to rest of a vehicle seat and an upright portion 46 adapted to abut against the seat back of the vehicle seat. The connection between the seat body 40 and the base member 42 is of known type (e.g. as described in U.S. Pat. No. 5,611,596) and will not be described in detail.

The upright portion 46 of the base member contains a slot 48, the upper part of which is of sufficient thickness to accommodate to strap of a vehicle seat belt. The lower part 50 is of triangular cross-section so that the thickest part of the slot 48 is at its bottom end.

A lever 52 is pivotally mounted, for angular movement about a vertical axis, on a pivot joint 54 in a cavity in the bottom part of the base portion 44. The lever 52 has a handle 56 on one end which projects through a slot 58 in the front edge of the base part 44. An end portion 60 thereof at the opposite end to the handle 54 is bent upwardly so as to project through an opening 62 in the bottom of the triangular part 50 of the slot. A carrier 64 is mounted on the end portion 60 of the lever 52. The carrier 64 has a recess 66 for receiving a tongue 68 of a vehicle seat belt 70. The seat belt 70 can therefore be threaded through the slot 48 by moving the lever 52 from the position shown in FIG. 3 to the position shown in FIG. 4.

Figure 5:
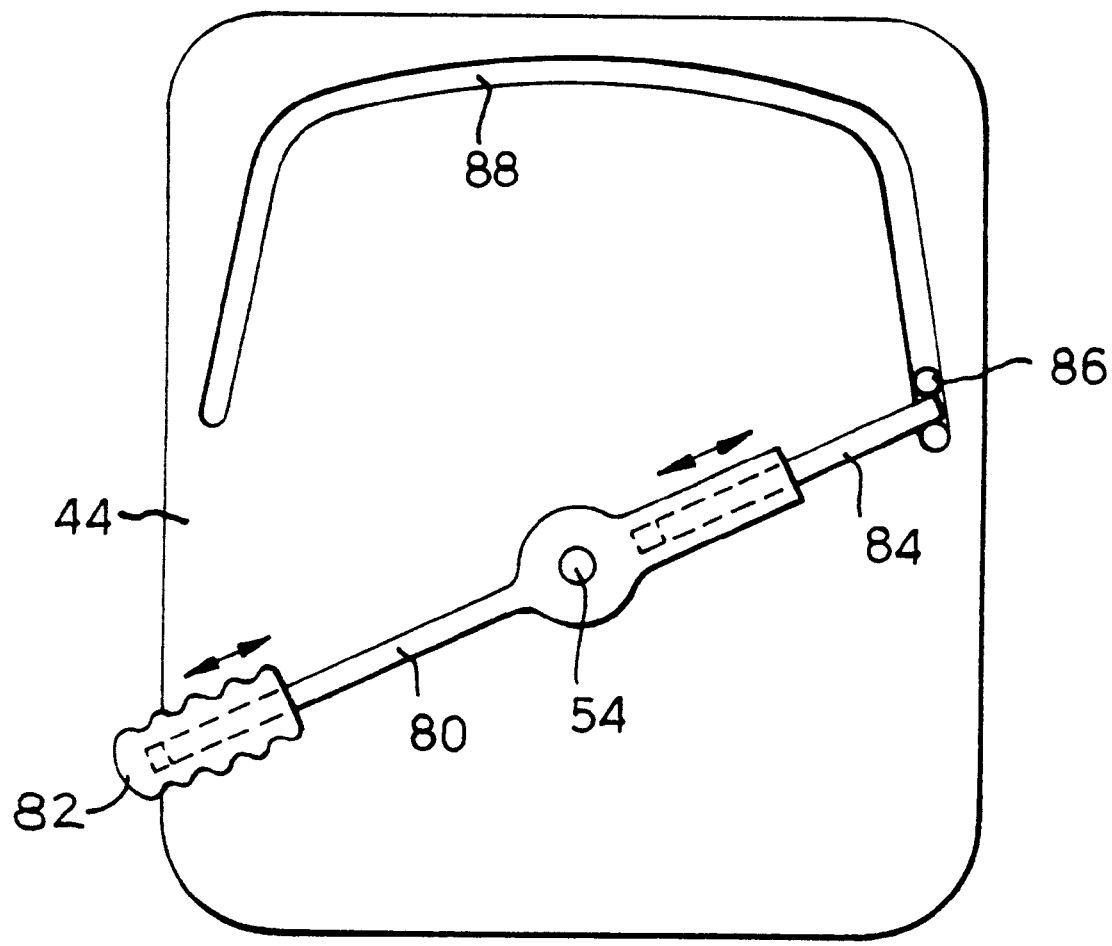
FIG. 5 is a plan view from below of a modification to the second embodiment.

FIG. 5 illustrates a modification to the seat shown in FIGS. 3 and 4, corresponding parts being denoted by the same reference numerals. The lever 52 is replaced by a lever formed in three telescopically interconnected parts. A central part 80 is mounted on the pivot joint 54. One end part 82 replaces the handle 56 and can be retracted within the base part 44 after the seat has been installed in a vehicle. The other end part 84 is pivotally coupled to a slider 86 on which the carrier 64 (not visible in FIG. 5) is mounted. The slider 86 is located in a track 88 which extends round the back of the seat. This allows the path of the carrier 64 round the back of the seat to be straighter than the arcuate path of FIGS. 3 and 4 and also allows the end positions of the carrier 64 to be further forwards from the backrest of the vehicle seat.

We claim:

1. A child safety seat comprising:

a formation having an opening adapted to receive a vehicle seat belt to secure the child seat on a vehicle seat so that the vehicle seat belt passes along a predetermined path through said opening between a seated occupant of the child seat and the vehicle seat;

a traveller slidably mounted in a track extending through said opening so as to be movable from one side of the child seat to the other side of the child seat; and respective handles and coupling means, for coupling part of a vehicle seat belt to the traveller, at both ends of the traveller to enable a vehicle seat belt to be pulled through the opening from either side.

2. A child safety seat comprising:

a formation having an opening adapted to receive a vehicle seat belt to secure the child seat on a vehicle seat so that the vehicle seat belt passes along a predetermined path between a seated occupant of the child seat and the vehicle seat:

a traveller movable from one side of the child seat through the opening to the other side of the child seat;

coupling means for coupling part of a vehicle seat belt to the traveller; and a lever being pivotally mounted below a seat portion of the child seat for angular movement about a vertical axis, the traveller being coupled to one end of the lever and a handle being formed on the other end thereof.

3. A child safety seat according to claim 2, wherein the traveller is mounted on said one end of the lever.

4. A child safety seat according to claim 3, wherein the traveller comprises a semi-rigid slider of a greater length than the track and said coupling means is secured to a first end of the traveller and said drive means comprises a handle secured to a second end of the traveller for pulling and pushing the traveller along the track.

5. A child safety seat according to claim 2, wherein the part of the vehicle seat belt arranged to be coupled to the traveller is a tongue for a vehicle seat belt buckle.

6. A child safety seat according to claim 2, wherein the traveller is slidably mounted in a track extending through said opening.

7. A child safety seat according to claim 6, wherein the traveller is slidable along a non-circular track and coupled to the lever by a link which is linked to the lever for radial movement thereto.

8. A child safety seat according to claim 6, wherein the traveller is mounted on said one end of the lever.

9. A child safety seat according to claim 6, wherein the part of the vehicle seat belt arranged to be coupled to the traveller is a tongue for a vehicle seat belt buckle.

10. A child safety seat comprising:

a formation having an opening adapted to receive a vehicle seat belt to secure the child seat on a vehicle seat so that the vehicle seat belt passes along a predetermined path between a seated occupant of the child seat and the vehicle seat from one side of the seat to the other side of the seat;

a traveller secured to the child seat so as to be displaceable along said path;

coupling means for coupling part of a vehicle seat belt to the traveller; and drive means for moving the traveller along said path.

11. A child safety seat according to claim 10, wherein the part of the vehicle seat belt arranged to be coupled to the traveller is a tongue for a vehicle seat belt buckle.

12. A child safety seat according to claim 10, wherein respective coupling means and handles are provided at both ends of the traveller to enable a vehicle seat belt to be pulled through the opening of the child safety seat from either side.

13. A child safety seat according to claim 10 wherein the traveller is slidably mounted in a track extending through said opening.

14. A child safety seat according to claim 2, wherein the traveller is slidable along a non-circular track and coupled to the lever by a link which is linked to the lever for radial movement relative thereto.

15. A child safety seat according to claim 2, wherein the part of the vehicle seat belt arranged to be coupled to the traveller is a tongue for a vehicle seat belt buckle.

* * * * *